Patented Oct. 18, 1949

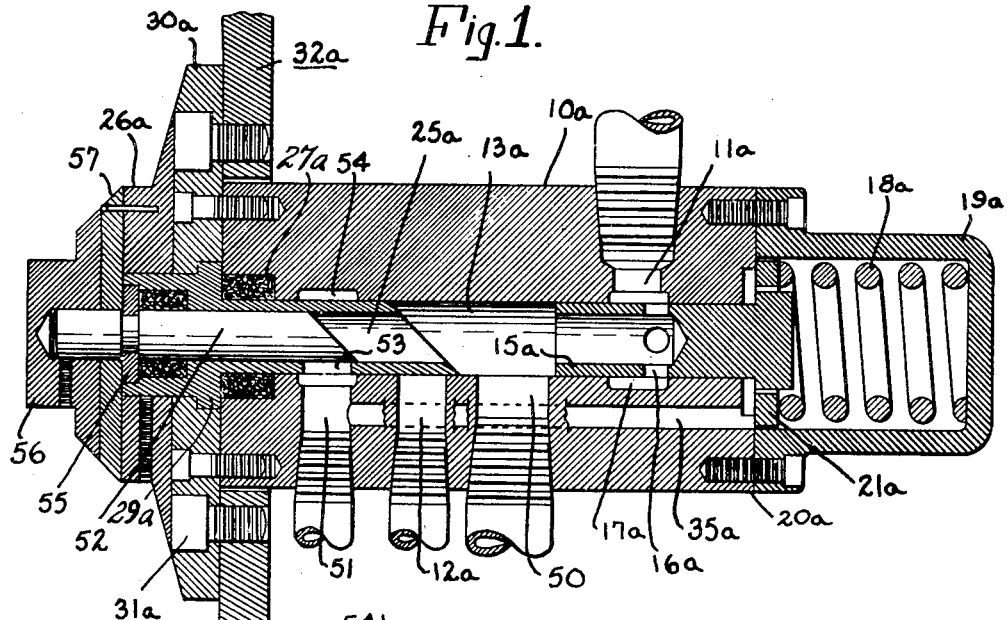
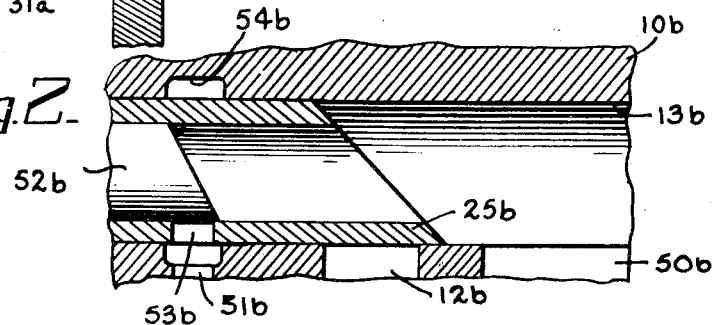
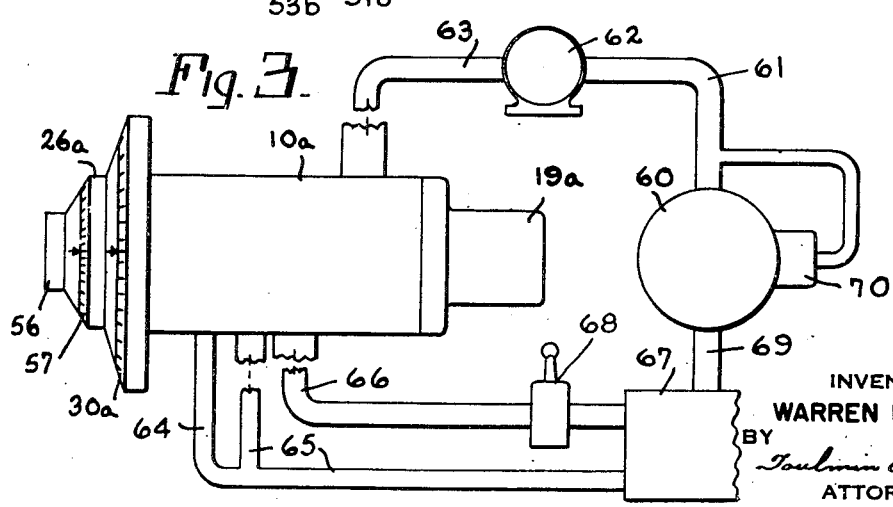
INVENTOR
WARREN R. TUCKER.
BY
ATTORNEYS

2,484,916

UNITED STATES PATENT OFFICE 2,484,916

VALVE

Warren R. Tucker, Dayton, Ohio, assignor to H-P-M Development Corporation, Wilmington, Del., a corporation of Delaware Application April 14, 1944, Serial No. 531,028

7 Claims. (Cl. 277—59)

This invention relates to valves. More specifically, this invention relates to control valves for hydraulic circuits.

In many hydraulic circuits it is of advantage to control the speed of the driven element or elements. For example, such a control is particularly to be desired in a hydraulically driven machine tool wherein the efficiency of the machine and the quality of the work produced is greatly influenced by the relative speeds of the workpiece and a tool or tools accomplishing the machining. In addition to the above, many other examples will suggest themselves to those skilled in the art.

Accordingly, one object of this invention is to provide an improved valve for controlling the flow of fluid therethrough independently of pressure conditions existing in the associated hydraulic circuit.

Another object of the invention is to provide a valve for controlling flow which consists of an adjustable choke.

Still another object is to provide a valve for accomplishing the results of, and controlled according to, the above objects and including a graduated hand wheel so that the setting of the adjustable choke may be readily observed.

These and other objects will become more apparent upon reference to the following description taken in connection with the accompanying drawings, in which:

Fig. 1 is a medial longitudinal vertical sectional view taken through a valve formed in accordance with the present invention;

Fig. 2 is an enlarged fragmentary vertical sectional view taken through the adjustable choke members of a slightly modified form of valve; and Fig. 3 is a diagrammatic view of a hydraulic circuit embodying a valve of the present invention.

General Arrangement

According to this invention a control valve is provided having a casing with an inlet port and a plurality of outlet ports. Fluid flow from the inlet port to the outlet ports is controlled so that a motor connected serially with the control valve and a source of fluid pressure is caused to operate at a predetermined speed substantially irrespective of load or pressure conditions on the said motor.

The control valve includes adjustable restrictions and a variable restriction arranged serially within the valve casing and operatively connected so as to selectively effect the desired control of fluid flow. The adjustable restrictions are accomplished by manually adjustable valve members and suitable indicia are provided whereby the positions of the adjustable valve members are indicated. The variable restriction is accomplished by a valve member urged into a position of minimum restriction by a yielding means and toward a position of greater restriction in accordance with the pressure drop across the adjustable restriction. The cooperation of the several restrictions is effective to control the flow of fluid through the valve in accordance with the settings of the adjustable valve members.

Detailed Description

Referring to the drawings and, in particular, to Fig. 1, the valve disclosed therein will be seen to comprise a casing 10a having a single fluid inlet port 11a, three longitudinally spaced fluid outlet ports 50, 12a and 51 respectively, and a longitudinally extending bore 13a interconnecting the inlet and outlet ports.

Reciprocably mounted within the bore 13a is a valve member 15a which is operable to control the degree of communication between the bore and the inlet port 11a. The member 15a is formed with an axial bore and has passages or apertures 16a extending substantially radially outward from the bore to an annular groove 17a formed in the casing 10a, the groove 17a being in continuous fluid communication with the inlet port 11a.

The member 15a is continuously urged to the left by a spring 18a mounted within a spring housing 19a attached to the end of the casing 10a, as at 20a. One end of the member 15a extends into the housing 19a and terminates therein in an enlarged head portion 21a. The head 21a serves both as a stop for limiting the leftward movement of the member 15a and as an abutment against which the spring 18a rests.

Rotatably mounted within the bore 13a of the casing 10a, at the end opposite the valve member 15a, is a first adjustable choke member 25a which is arranged to control the outlet port 12a. The member 25a, as shown in Fig. 1, comprises an axially bored body having a beveled end thereon adapted to variably overlap and control the degree of opening of the outlet port 12a as the said choke member is rotated. The member 25a extends leftwardly through the end of the casing 10a and terminates in a relatively enlarged head portion upon which is carried a circular hand wheel or knob 26a which is provided for the purpose of rotatably adjusting the member 25a. Suitable packing, as at 27a, surrounds the valve member 25a and prevents leakage of fluid from the interior of the valve casing. The enlarged head portion of the member 25a is further formed with an enlarged circular flange 29a which abuts with the end of the casing 10a adjacent the packing 27a.

The flange 29a fits within a cooperating recess formed on a plate 30a which is connected to the left end of the casing 10a. The plate 30a, in addition to retaining the member 25a, provides a mounting means for mounting the valve on a panel or within a wall of a machine. The plate 30a extends laterally outwardly from the casing 10a and includes apertures suitable for receiving screws 31a or the like so as to retain the valve in position on a panel or machine wall generally indicated at 32a.

Referring to Fig. 3, the indicia whereby the setting of the choke member 25a is indicated will be seen. These indicia comprise a scale suitably subdivided and provided with numerals on the member 30a and a suitable index mark on the knob 26a. By observing the relative positions of the scale and index mark the position of the member 25a may readily be ascertained.

The valve member 25a is axially bored and rotatably receives a second adjustable choke member 52 having a beveled end portion which is adapted to overlap and control the degree of opening of an aperture 53 formed in the choke member 25a. The aperture 53 communicates with an annular groove 54 in the casing 10a, which groove is in continuous fluid communication with the outlet port 51. Thus, axial adjustment of the member 52 with respect to the aperture 53 determines the degree of communication between the bore 13a of the valve casing and the third outlet port 51.

The choke member 52 is provided with a collar 55 which fits within a recess formed in the enlarged head portion of the member 25a to align the second choke member 52 with respect to the member 25a, the collar 55 and member 52 being maintained in such positions by a plate 57 which abuts and is connected with the outer face of the knob 26a. At its extreme outer end, the member 52 carries an adjusting knob 56 which is provided with a suitable index mark adapted to cooperate with a suitable scale provided upon the plate 57, so that the setting of the choke member 52 with respect to the aperture 53 may be readily ascertained at all times.

The spring chamber 19a is in continuous fluid communication with the outlet port 51 by way of a bore or channel 35a which extends through the valve casing 10a.

Referring to Fig. 2, there is shown an arrangement whereby the second adjustable choke member may serve as a vernier for effecting precise adjustment of the valve subsequent to the initial adjusting thereof by the first adjustable choke member. Similar parts of this view bear the same reference numerals as in Fig. 1, but with the substitution of a subscript b. In this figure the aperture 53b has been reduced in size from that of the aperture 53 in Fig. 1 and the bevel on the member 52b is correspondingly of a steeper angle. The effect of this arrangement is to cause the angular rotation of the second choke member 52b to have less effect on the rate of flow through the valve than an equal rotation of the member 52. Hence, the hand wheel or knob associated with the member 52b may be provided with a more widely graduated scale so as to permit of a very precise adjustment of the valve.

Referring to Fig. 3, there is shown a hydraulic circuit including a source of pressure fluid, a motor driven thereby and a valve of the type indicated in Fig. 1 connected into the circuit so as to control the operation of the motor. In this figure, a source of pressure fluid 60 supplies actuating fluid through conduit 61 to a motor 62 which exhausts the fluid through a conduit 63 to the inlet port of the control valve. The valve has connected to the outlet ports 51, 12a and 50 the conduits 64, 65 and 66 respectively.

The conduit 65 is connected with the reservoir 67 and also with the conduit 64. The conduit 66 connects with the reservoir 67 through a valve 68 which is selectively movable into position to interrupt the fluid communication between the conduit 66 and the reservoir 67. The reservoir is connected by a conduit 69 to the suction side of the source of pressure fluid 60. The source 60 may include a fluid operable servomotor 70 for controlling the delivery therefrom in response to the pressure within the conduit 61.

Referring now to Figures 1 and 3, in operation, the valve functions in the following manner: Fluid pressure is supplied to the motor 62 by the source of fluid pressure 60 and passes from the motor exhaust through the conduit 63 to the inlet port 11a of the control valve. From the inlet port 11a of the valve, pressure fluid passes through the valve casing and back to the reservoir 67 through one or more of the outlet ports of the valve. Assuming the selector valve 68 to be in a closed condition, the fluid introduced through the inlet port 11a flows through the bore 13a, and, depending upon the relative positions of the choke members 25a and 52 with respect to their associated outlet ports 12a and 51, a back pressure is created within the bore 13a in the event that the choke members 25a and 52 establish a greater restriction with respect to their associated outlet ports than is provided between the member 15a and the inlet port 11a. In this instance, the back pressure within the bore 13a serves to force the valve member 15a rightwardly against the thrust of the spring 18a to decrease the effective opening of the apertures 16a, and thereby create a pressure drop within the valve. Simultaneously, the pressure at the outlet port 51 is conducted through the passage 35a and stands against the right hand end of the member 15a so as to urge the same in cooperation with the spring 18a to the left, in a direction to increase the effective opening of the apertures 16a. Thus, the effect of oppositely disposed pressure areas provided at either end of the member 15a in conjunction with the spring 18a is to position the apertures 16a of the valve member relative to the inlet port 11a so that the rate of fluid flow through the valve is substantially constant at any position of the choke members 25a and 52. For example, if the rate of flow of fluid entering the valve through the inlet port 11a increases over a given rate, the restriction provided by the members 25a and 52 with respect to their associated outlet ports causes an initial pressure build-up within the bore 13a of the valve which acts upon the left hand end of the valve member to move the same rightwardly against the action of the spring and the fluid pressure acting on the right hand end of the valve member to initially decrease the effective size of the apertures 16a with respect to the inlet port, and consequently, to decrease the flow of fluid through the inlet port 11a and within the bore of the valve. Conversely, at given settings of the members 25a and 52, if the rate of flow through the inlet port 11a decreases below a given rate, the pressure differential between the opposite ends of the member 15a will cause the valve member 15a to move leftwardly to increase the effective size of the apertures 16a in relation to the inlet port 11a and thereby permit an increased rate of flow within the bore 13 of the valve. The rate of flow through the valve may be varied by adjusting the angular locations of the choke members 25a and 52 so as to vary the restriction created thereby between the valve bore and the outlet ports 12a and 51. It will be understood that either of the members 25a or 52 may be adjusted from positions where substantially no fluid may pass from the bore to the outlet ports to positions where substantially no restriction whatsoever exists between the bore and the outlet ports 12a and 51. Thus, the valve may be adjusted so as to prevent the flow of fluid through the motor, to permit free flow of fluid through the motor, or to control the speed of the motor at any value therebetween. It will be apparent that, because of the fluid communication between the right hand end of the member 15a and the outlet port 51, the valve may be located, if desired, on the pressure side of the motor without in any way affecting its operation or the efficiency thereof.

By nature of the unrestricted outlet port 50 and the selector valve 68 interposed between such outlet port and the reservoir 67, an unrestricted discharge of the valve may be had whenever desirable, particularly when it is desired that the driven element, such as the motor 62, may operate at a high speed to approach, or retract from, a given working position. By nature of the dual choke members 25a and 52, a relatively wide range of speed control is possible, and in the modified form of valve disclosed in Fig. 2, the difference in angularity between the beveled ends of each of the choke members 25b and 52b provides a more critical adjustment, with the second choke member 52b acting in the capacity of a vernier adjustment for the first choke member 25b.

In view of the foregoing, it will be seen that the present invention provides an improved type of adjustable choke valve which functions, when interposed within a hydraulic operating circuit, such as indicated in Fig. 3, to provide a substantially constant rate of fluid flow through the circuit and the mootr means to be driven thereby, and at the same time providing for ready adjustment to vary the rate of flow through such circuit over an unlimited range. Valves formed in accordance with the present invention are characterized by their mechanical efficiency, ease of operation and economy of manufacture and maintenance.

While preferred forms of the present invention have been disclosed in detail, it will be manifest that various modifications dealing with constructional details are possible without departing from the spirit of the invention or the scope of the following claims.

Having thus fully described my invention, what I claim as new and desire to secure by Letters Patent, is:

1. A control valve having a casing with a bore therethrough and a plurality of outlet ports in communication with said bore, means for restricting one of said outlet ports comprising a first valve member rotatably mounted in said bore and having a formed end thereon adapted variably to restrict said one of said outlet ports as said member is rotated, said member being axially bored to provide a passage in continuous fluid communication with said axial bore and another of said outlet ports, a second valve member mounted in said passage and adapted variably to restrict said passage having a formed end thereon for accomplishing said restriction as said second valve member is rotated relative to said first valve member, means for selectively and independently adjusting said first and second valve members, means for indicating the setting of said first and second valve members comprising cooperating fixed and movable indicia, and means comprising an unrestricted outlet port for permitting free fluid flow from said valve.

2. In a control valve, a casing having an inlet port, a pair of controlled outlet ports and a valve bore interconnecting said ports, a first valve member rotatably mounted in said valve bore having a formed end thereon adapted to restrict one of said outlet ports at a predetermined rate as said first member is rotated, a bore in said first member opening into said valve bore and a passage continuously hydraulically connecting said bore with the other of said outlet ports, a second valve member rotatably mounted in said bore having a formed end thereon adapted to restrict said other outlet port at a predetermined rate different from said first mentioned predetermined rate as said second valve member is rotated relative to said first valve member, and means for angularly adjusting said first and second valve members selectively and independently.

3. In a control valve, a body having a bore with an inlet and a plurality of outlet ports, a plurality of telescopically arranged valve members in said bore for restricting said ports and each having a beveled end thereon overlying one of said ports, and means of angularly adjusting said valve members individually for varying the restrictions of said ports.

4. In a control valve, a body having a bore with an inlet and a plurality of outlet ports, a plurality of telescopically arranged valve members in said bore for restricting said ports and each having a beveled end thereon overlying one of said ports, said beveled ends being formed to different angles to provide both coarse and fine adjustments, and means of angularly adjusting said valve members individually for varying the restrictions of said ports.

5. In a control valve, a body having a bore with an inlet and a plurality of outlet ports, a plurality of telescopically arranged valve members in said bore for restricting said ports and each having a beveled end thereon overlying one of said ports, means of angularly adjusting said valve members individually for varying the restrictions of said ports, and an auxiliary unrestricted outlet port.

6. In a control valve, a body having a bore with an inlet and a plurality of outlet ports, a plurality of telescopically arranged valve members in said bore for restricting said ports and each having a beveled end thereon overlying one of said ports, said valve members being axially fixed in said bore but rotatable therein, and means external of said body for individually angularly adjusting said valve members for varying the restriction of said ports thereby.

7. In a valve having a bore, axially spaced first and second outlet ports for said bore, a sleeve in said bore extending across both of said ports, a beveled end on said sleeve operable as said sleeve is rotated variably to restrict said second port, a radial port in said sleeve, a channel connecting said radial port with said first port, a cylindrical valve member in said sleeve having a beveled end overlying said radial port and operable as said valve member is rotated variably to restrict said radial port, and means operable from externally of said valve for angularly adjusting said sleeve in said bore and said valve member in said sleeve.

WARREN R. TUCKER.

REFERENCES CITED

The following references are of record in the file of this patent:

UNITED STATES PATENTS

| Number | Name | Date |
|---|---|---|
| 1,010,811 | Severin | Dec. 5, 1911 |
| 1,397,867 | Jones | Nov. 22, 1921 |
| 1,467,522 | Amsler | Sept. 11, 1923 |
| 1,640,842 | Loomis | Aug. 30, 1927 |
| 1,982,711 | Vickers | Dec. 4, 1934 |
| 2,000,553 | Alden | May 7, 1935 |
| 2,157,707 | Keel | May 9, 1939 |
| 2,259,636 | Harrington | Oct. 21, 1941 |
| 2,306,379 | Conradson | Dec. 29, 1942 |

FOREIGN PATENTS

| Number | Country | Date |
|---|---|---|
| 498,199 | Great Britain | 1939 |